UNITED STATES PATENT OFFICE.

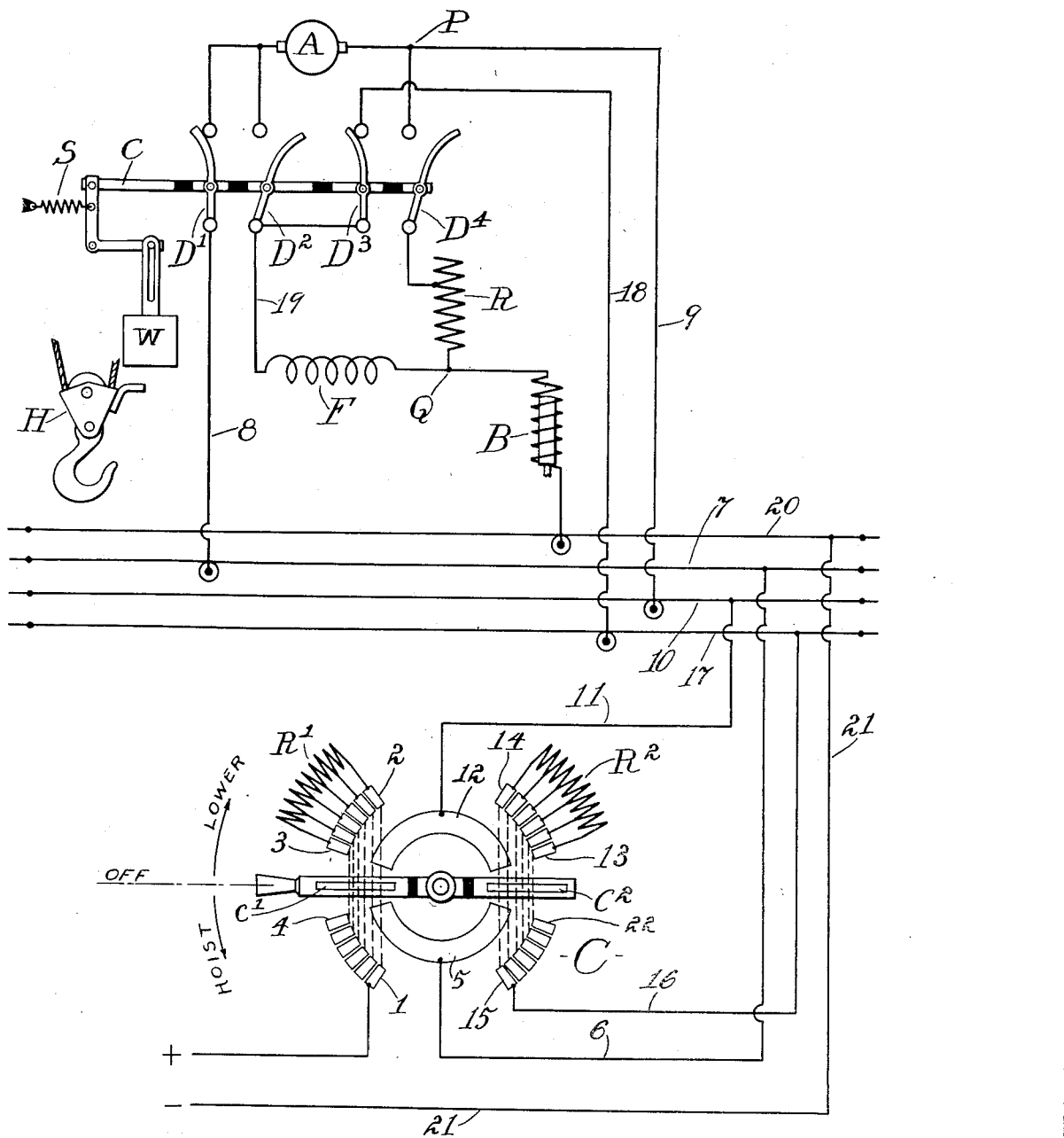

REUBEN I. WRIGHT, OF WICKLIFFE-ON-THE-LAKE, OHIO, ASSIGNOR TO THE ELECTRIC CONTROLLER AND MANUFACTURING COMPANY, OF CLEVELAND, OHIO, A CORPORATION OF OHIO.

SAFETY LIMIT-STOP.

1,113,593. Specification of Letters Patent. Patented Oct. 13, 1914.

Application filed September 6, 1913. Serial No. 788,484.

*To all whom it may concern:*

Be it known that I, REUBEN I. WRIGHT, a citizen of the United States, residing at Wickliffe-on-the-Lake, in the county of Cuyahoga and State of Ohio, have invented new and useful Improvements in Safety Limit-Stops, of which the following is a specification.

My invention relates to the control of electric motors, and particularly to that type of control in which the motor is caused to be stopped automatically when the mechanism driven thereby has reached a predetermined limit of travel.

More particularly, it relates to the stopping of a series wound motor, effected by connecting the armature in a dynamic braking circuit including the series field of the motor.

One of the objects of my invention is to secure at the limit of travel the establishment of a dynamic braking circuit for the motor exclusive of the controller mechanism and connections ordinarily used in the operation of the motor.

Another object is to prevent the flow of current through the motor windings after the motor is stopped and until the operator changes the circuits to reverse the motor.

Another object is to provide connections through the stopping device whereby the motor can be reversed by the usual movement of the controller mechanism for such reversal.

Still another object is to effect the restoration of the stopping device to its normal position by the movement of the motor and its driven mechanism as it leaves the limiting position in which it has been brought to rest by the said device.

Other objects and advantages will be readily understood from the following description.

The accompanying drawing is a diagrammatic representation of a controlling system embodying my invention.

Referring to the drawing, the motor to be controlled is shown with the armature A and the series field F.

B represents the winding of a friction brake which is arranged to stop the motor when its winding is deënergized. I prefer to connect this winding in series with the motor circuit, as a measure of safety in the event that any of the motor connections are broken.

The operating controller for the motor is indicated at C, which is the usual type of reversing controller for operating the motor in one direction or the other, the regulation of speed being accomplished by the varying of the resistances R' and R² in the motor circuit. When the motor is arranged to operate an electric hoist, indicated by the hook block H, and is arranged to travel with respect to the controller C, suitable trolley wires may be provided as indicated at 7, 10, 17, and 20.

R is a resistance arranged to be connected in a dynamic braking circuit, including the armature and series field of the motor, when the mechanism driven by the motor reaches a certain limit of travel.

For the stopping device I prefer to use the quick-acting limit switch disclosed in Wright and Stratton's application, Serial Number 728,682. This switch is indicated in the drawing as comprising the normally closed switches D' and D³ and the normally open switches D² and D⁴. These are connected together by a bar C and held in their normal position by the weight W. When the hook block H reaches its limit of travel it engages and lifts the weight, and the tension spring S operates the stopping device, opening the switches D' and D³, and closing the switches D² and D⁴. The device is so arranged that the switches D² and D⁴ close immediately upon the opening of the switches D' and D³, thereby establishing the dynamic braking circuit before the magnetism of the series field has had time to die out entirely. The resistance R in the dynamic braking circuit is shown adjustable so that the motor and the driven mechanism will stop in any desired period of time. The friction-brake winding B is deënergized when the safety device operates, so that the friction-brake assists the dynamic brake in stopping the motor.

When it is desired to operate the motor in the hoisting direction, the controller arm is moved to engage the contacts 4 and 13, the hoisting circuit being as follows: from the positive to the contact 1, the cross connection to the contact 2, the resistance R' to the contact 3, the cross connection to the contact 4, the controller brush c' to the contact 5, the wire 6, the trolley wire 7, the wire 8, the switch D', the motor armature A from left to right, the wire 9, the trolley wire 10, the wire 11, the contact 12, the brush $c^2$ to the contact 13, the resistance $R^2$, the contact 14, the cross connection to the contact 15, the wire 16, the trolley wire 17, the wire 18, the switch $D^3$, the wire 19, the series field F from left to right, the brake winding B, the trolley wire 20 and the wire 21 to the negative. The brake winding B releases the friction brake and the motor operates in the hoisting direction at its slowest speed. To increase the speed of the motor the controller handle is moved so as to cut out the resistances R' and $R^2$. To operate the motor in the lowering direction, the controller handle is moved to engage the contacts 3 and 22, whereupon the lowering circuit is as follows: from the positive to the contact 1, the cross connection to the contact 2, the resistance R' to the contact 3, the brush c' to the contact 12, the wire 11, the trolley wire 10, the wire 9, the motor armature A from right to left, the switch D', the wire 8, the trolley wire 7, the wire 6, the contact 5, the brush $c^2$ to the contact 22, the cross connection to the contact 13, the resistance $R^2$ to the contact 14, the cross connection to the contact 15, the wire 16, the trolley wire 17, the wire 18, the switch $D^3$, the wire 19, the series field F from left to right, the brake winding B, the trolley wire 20, and the wire 21 to the negative. It is seen that the current has been reversed in the armature and remains the same as before in the field, so that the motor operates in the opposite direction. The speed of the motor in this direction can be regulated by cutting in or out more or less of the starting resistances R' and $R^2$. If when the motor is operating in the hoisting direction, the hook block reaches its limit of travel and engages the weight W, the stopping device will be operated as before explained, opening the switches D' and $D^3$ and closing the switches $D^2$ and $D^4$. The hoisting circuit is opened at the contacts of the switches D' and $D^3$, and the dynamic braking circuit is closed through the switches $D^2$ and $D^4$, the current in the latter circuit flowing from the left-hand brush of the armature A through the switch $D^2$, the wire 19, the field F, the resistance R, the switch $D^4$ to the right-hand brush of the armature. This dynamic braking circuit, assisted by the friction brake whose winding is deënergized, causes the motor to quickly come to rest, stopping the upward travel of the hook block. To operate the motor in the lowering direction, so as to restore the mechanism to its normal condition and the stopping device to its normal position, the operator merely moves his controller handle to the lowering side of the controller, as he would do in the usual way for operating the motor in the lowering direction. The lowering circuit is now as follows: from the positive to the contact 1, the cross connection to the contact 2, the resistance R', the contact 3, the controller brush c' to the contact 12, the wire 11, the trolley wire 10, the wire 9 to the point P. Here the circuit divides, one branch including the armature A, the switch $D^2$ and the field F, the other branch including the switch $D^4$ and the resistance R. The branches reunite at the point Q and proceed through the brake winding B, the trolley wire 20, and the wire 21 to the negative. The current flows through the motor in a direction to cause it to operate in the lowering direction, and the brake winding B, being energized, releases the friction brake; the hook block H is lowered to its normal operating position, and the weight W, becoming disengaged by the hook block H, restores the stopping device to its normal position, which is that shown in the drawing. The lowering circuit is then restored to its normal condition, which I have previously traced. It will be noticed that the connections are so made that when the motor comes to rest, after having been stopped by the stopping device, no current flows through the motor windings or any of the controlling apparatus until the operator moves his controller to the lowering position so as to cause the motor to be reversed and restore the hoisting mechanism to its normal running condition.

It will be readily understood that my invention can be used in connection with an electric motor operating other mechanisms than electric hoists, and that the controller mechanism can assume other forms than that of the simple manually-operated type indicated in the drawing. It may also be used with a motor having a shunt field winding.

Other changes can be made in the apparatus, as will be obvious to those skilled in the art, without departing from the spirit of my invention.

I claim—

1. In a control-system for electric hoists, a motor having a series field, a controller mechanism for closing a hoisting circuit through the motor, and a stopping device comprising means for opening the hoisting circuit and for closing a local dynamic braking circuit including the motor armatures and series field, said means directing the current through the armature and series field to cause the motor to run in the lowering direction when the controller mechanism is reversed.

2. In a control-system for electric hoists, a motor having a series field winding, an operator's switch for closing a hoisting or lowering circuit therefor, a stopping device comprising contacts for connecting the motor armature and series field in a local dynamic braking circuit and for opening the hoisting circuit, said contacts being included in a circuit which causes the motor to be operated in the lowering direction when the controller is moved to the lowering position.

3. In a control-system for electric motors, a motor, forward and reverse circuits therefor, means operated by the motor when running in one direction and comprising contacts for opening the motor circuit corresponding to that direction and for connecting the motor armature and seres field in a local dynamic braking circuit, and a circuit through the said contacts by which the motor can be reversed to restore the said means to its normal position.

4. In a motor control-system, an electric motor, a reversing controller mechanism therefor, and a device operated by the motor running in one direction comprising means for opening the motor circuit through the controller, and means for connecting the armature and field in a dynamic braking circuit exclusive of the controller mechanism, the said means connecting the armature and field in a circuit which, when the controller is reversed, causes the motor to run in the opposite direction.

5. In a control-system for electric motors, a motor having a series field, reversing controller mechanism for operating the motor in one direction or the other, a stopping device operated by the motor for disconnecting the motor from the controller mechanism and for including the motor armature and series field in a dynamic braking circuit exclusive of the controller mechanism, and a circuit including contacts of the controller mechanism and the said stopping device for reversing the motor to restore the device to its normal position.

6. In a control-system for electric motors, a motor, reversing controller mechanism for operating the motor in one direction or the other, a stopping device operated by the motor for disconnecting the motor from the controller mechanism and for including the motor armature in a dynamic braking circuit exclusive of the controller mechanism, and a circuit including contacts of the controller mechanism and the said stopping device for reversing the motor.

7. In a control-system for electric hoists, a motor having a series field, a hoisting circuit, a lowering circuit, a controller mechanism for closing said circuits, and a stopping device for connecting the motor armature and series field in a closed circuit, and for opening the hoisting circuit without rendering the lowering circuit ineffective.

8. In a control-system for electric hoists, a motor, a friction brake winding, a controller for connecting the motor armature, field and brake windings in series for operating the motor in the hoist direction, a stopping device for the motor comprising contacts for connecting the armature and field in a dynamic braking circuit exclusive of the brake winding, and a reversing circuit for the motor closable through the controller, the said brake winding, and the contacts of the said device.

Signed at Cleveland, Ohio, this fourth day of September, 1913.

REUBEN I. WRIGHT.

Witnesses:
  D. C. WRIGHT,
  J. G. BROSIUS.